(12) United States Patent
Liu et al.

(10) Patent No.: US 7,596,084 B2
(45) Date of Patent: Sep. 29, 2009

(54) METHOD FOR IMPLEMENTING DIFFSERV IN THE WIRELESS ACCESS NETWORK OF THE UNIVERSAL MOBILE TELECOMMUNICATION SYSTEM

(75) Inventors: Sheng Liu, Guangdong (CN); Baijun Zhao, Guangdong (CN); Jun Hu, Guangdong (CN)

(73) Assignee: UTSTARCOM (China) Co. Ltd., Beijing (CN)

( * ) Notice: Subject to any disclaimer, the term of this patent is extended or adjusted under 35 U.S.C. 154(b) by 604 days.

(21) Appl. No.: 10/561,057

(22) PCT Filed: Jun. 18, 2003

(86) PCT No.: PCT/CN03/00470

§ 371 (c)(1),
(2), (4) Date: Feb. 9, 2006

(87) PCT Pub. No.: WO2004/112406

PCT Pub. Date: Dec. 23, 2004

(65) Prior Publication Data

US 2007/0097926 A1    May 3, 2007

(51) Int. Cl.
  *H04L 12/26* (2006.01)
(52) U.S. Cl. ..................... 370/229
(58) Field of Classification Search ........... 370/229, 370/230, 230.1; 455/450, 403, 452.1, 422.1
See application file for complete search history.

(56) References Cited

U.S. PATENT DOCUMENTS 6,618,378 B1 * 9/2003 Giroux et al. ........... 370/395.1

2003/0093739 A1 * 5/2003 Han ..................... 714/746
2003/0174662 A1 * 9/2003 Malkamaki ............. 370/310
2004/0032875 A1 * 2/2004 Bly et al. ............... 370/412

FOREIGN PATENT DOCUMENTS

| CN | 1406006 | 3/2003 |
| WO | WO 02/03623 | 1/2002 |
| WO | WO 02/07381 | 1/2002 |

* cited by examiner

*Primary Examiner*—Chi H Pham
*Assistant Examiner*—Fan Ng
(74) *Attorney, Agent, or Firm*—Ladas & Parry LLP

(57) ABSTRACT

The present invention provides a method for using Differentiated Services (DiffServ) to implement the IP packet classification and the marking of a Differential Service Code Point (DSCP) for the quality of service (QoS) in the wireless access network of the IP-based universal mobile telecommunication system (UMTS). The present invention makes a classification to the data stream which is outgoing from the Iub interface at the Node B side, data stream which is outgoing from the Iub interface at the RNC side and data stream which is outgoing from the Iur interface at the RNC side according to the direction and the process of the respective data streams, and assigns and adjusts the priority of the data stream classified according to the principles for optimizing QoS and radio resources. When the network is congested, the data stream with a high level will have a higher priority than that with a lower level in queue and source occupancy, and the packet with a lower priority in the same queue is discarded. The DiffServ only contains a limited number of service levels and has little condition information, thus easy to be achieved and expanded.

11 Claims, 7 Drawing Sheets

Iub interface Control Plane Protocol Stack    Iu/Iur interface Control Plane Protocol Stack

| PHB Class | | AF$_{x1}$ | AF$_{x2}$ | AF$_{x3}$ |
|---|---|---|---|---|
| BE | | 000000 (0) | | |
| AF | AF$_{1y}$ | 001010 (10) | 001100 (12) | 001110 (14) |
| | AF$_{2y}$ | 010010 (18) | 010100 (20) | 010110 (22) |
| | AF$_{3y}$ | 011010 (26) | 011100 (28) | 011110 (30) |
| | AF$_{4y}$ | 100010 (34) | 100100 (36) | 100110 (38) |
| EF | | 101110 (46) | | |

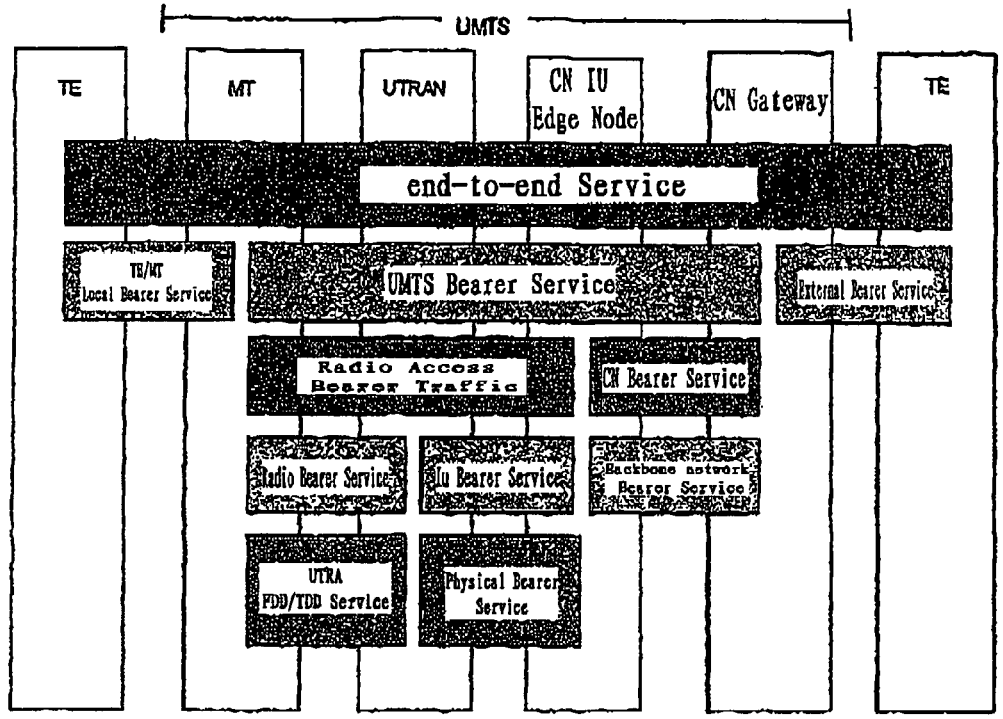

Fig. 7

| Class of Services in UMTS | Conversational Class | Streaming Class | Interactive Class | Background Class |
|---|---|---|---|---|
| Maximum Bit Rate | X | X | X | X |
| Delivery Order | X | X | X | X |
| Maximum SDU Size | X | X | X | X |
| SDU Format Information | X | X | — | — |
| SDU Error Ratio | X | X | X | X |
| Residual Bit Error Ratio | X | X | X | X |
| Delivery of Erroneous SDUs | X | X | X | X |
| Transfer Delay | X | X | — | — |
| Guaranteed Bit Rate | X | X | — | — |
| Traffic Handling Priority | — | — | X | — |
| Allocation/Retention Priority | X | X | X | X |
| Note: "X" represents the attribute parameter is valid, and "—" represents the attribute parameter is invalid ||||

Fig. 8

| Class of data streams | Priority | PHB Class of DiffServ |
|---|---|---|
| Control Plane Radio Application Protocol data Streams (RNSAP/NBAP) | 10 | EF |
| Conversational-Class Service | 9 | EF |
| Streaming-Class Service | 8, 7, 6 | $AF_{11}$, $AF_{12}$, $AF_{13}$ |
| Interactive-Class Service | 5, 4, 3 | $AF_{21}$, $AF_{22}$, $AF_{23}$ |
| Background-Class Service | 2 | BE |
| O&M data Stream | 1 | BE |

Fig. 11

METHOD FOR IMPLEMENTING DIFFSERV IN THE WIRELESS ACCESS NETWORK OF THE UNIVERSAL MOBILE TELECOMMUNICATION SYSTEM

FIELD OF THE INVENTION

The present invention relates to a method for realizing Differentiated Services in the wireless access network of the universal mobile telecommunication system, and particularly relates to a method for implementing the IP packet classification and the marking of a DiffServ Code Point (DSCP) while achieving guaranteed QoS (Quality of Service) by applying Differentiated Services (DiffServ) in the IP-based UMTS wireless access network (UTRAN).

DESCRIPTION OF THE RELATED ART

The UMTS (Universal Mobile Telecommunication System) is the third-generation mobile communication system of wireless technology using the WCDMA and its standardization is conducted by the 3GPP. So far, there have been four versions thereof, namely, the known Release 99, Release 4, Release 5 and Release 6. Version R5 is the first version of All-IP (or All-Packetization) and has the following improvements in the wireless access network respect: the High-speed Downlink Packet Access (HSDPA) technology is set forth so that the downlink rate can reach 8-10 Mbps, which has greatly improved the efficiency of an air interface; IP-based optional transmission modes are added to Iu interface, Iur interface, and Iub interface so that the wireless access network realizes the IP.

In the network system architecture of the UMTS as shown in FIG. 1, the core network (CN) 1 is connected to the UTRAN (Wireless Access Network) via an Iu interface, and the UMTS wireless access network UTRAN is connected to the UE (user equipment) via a Uu interface. FIG. 2 further shows a network architecture of the UMTS wireless access network, wherein a radio network control (RNC) 4 is connected to a circuit-switched (CS) domain of the core network 1 via an Iu-CS interface, and connected to a packet-switched (PS) domain of the core network 1 via an Iu-PS interface. The RNCs are connected to each other via Iur interfaces, and one RNC 4 is connected to one or more node(s)B 5 (Node B) via Iub interfaces. One Node B 5 contains one or more cells 6, and the cell is a basic unit for the wireless access by the UE. The RNC 4 usually performs the PDCP (Packet Data Convergence Protocol), RLC (Radio Link Control), and MAC (Medium Access Control) and other functions in the radio interface protocols, while the Node B 5 performs the physical layer function in the radio interface protocols. In addition, for the mobility of the UE, the radio bearer of one UE can be connected by a Controlling Radio Network Controller (CRNC) to a Serving Radio Network Controller (SRNC) via the Iur interface, and at this time, the CRNC is called a Drift Radio Network Controller (DRNC).

FIG. 3 is a schematic view showing the architecture of the UMTS wireless access network UTRAN interface protocol. It can be seen that, the UTRAN interface protocol is divided into a radio network layer and a transport network layer in a horizontal direction; and in a vertical direction, the UTRAN interface protocol is divided into two protocol stacks: a control plane and a user plane, and it further includes a transport network control plane for controlling the transport network layer. In the UTRAN of Release 5, when the transport network layer uses. the IP RAN (IP-based Radio Access Network) technology, the transport network control plane is not needed. FIG. 4 shows the user plane transport network layer protocol stack of Iu, Iur and Iub interfaces based on the IP RAN technology in the UMTS of Release 5. In FIG. 4, RTP, UDP and GTP-U represent real-time transport protocol, user data protocol and user plane GPRS tunnel protocol, respectively. In the user plane radio network layer, the Iu interface is the Iu UP (User Plane) protocol, and the Iur/Iub interfaces are FP (Frame Protocol) data frame protocols corresponding to respective transmission channels. FIG. 5 shows Iu, Iur and Iub interface control plane protocol stacks based on the IP RAN technology in the UMTS of Release 5. In FIG. 5, SCCP, M3UA and SCTP represent signaling connection control part, SS7 MTP3 User Adaptive Layer, and Streaming Control Transmission Protocol, respectively, wherein the radio network layer application protocols of the Iu/Iur/Iub interfaces are RANAP (Radio Access Network Application Part), RNSAP (Radio Network Sub-system Application Part) and NBAP (Node B Application Part), respectively. For the details of the above interface protocols of the UMTS wireless access network UTRAN, TS 25.4xx serial protocol documents of the 3GPP (Third Generation Partnership Project) can be consulted. Furthermore, according to TS25.442, Iub and other interfaces in the UTRAN further have IP-based O&M (Operation and Maintenance) data streams transmitted.

It can be seen from FIG. 4 and FIG. 5 that, the Iu, Iur and Iub interface control planes and user planes in the IP RAN are all IP networks based on IPv6 (IPv4 is an optional IP version) in the transport network layer. According to protocols TS25.414, TS25.426, TS25.422, TS25.432 and the like, the Iu, Iur and Iub interface transport network layers all need to support the marking of DiffServ Code Points (DSCP), so as to support the guaranteed QoS (Quality of Service) technology based on the DiffServ (Differentiated Services) in the IP RAN.

As above-described, the FP data frames of the Iur/Iub interface user plane radio network layers correspond to respective transmission channels, and besides the FP data frames, the FP frame protocols further comprise inband control signaling frames. In the Iur/Iub interfaces, there exist FP data frames corresponding to the Dedicated Transmission Channel (DCH), and in the Iur interfaces, common transmission channels corresponding to the FP data frames include the RACH (Random Access Channel) and the CPCH (Common Packet Channel) in the uplink direction, and the FACH (Forward Access Channel), the DSCH (Downlink Shared Channel) and the HS-DSCH (Hgh-Speed Downlink Shared Channel) in the downlink direction. In the Iub interfaces, the common transmission channels corresponding to the FP data fiames include the Random Access Channel (RACH) and the Common Packet Channel (CPCH) in the uplink direction, and the Forward Access Channel (FACH), the Downlink Shared Channel (DSCH), the High-Speed Downlink Shared Channel (HS-DSCH) and the Paging Channel (PCH) in the downlink direction. One FP data frame of the Iub interface bears all the transmission blocks of the corresponding physical channel within a TTI (Transmission Time Interval). As above-described, in the Iur interfaces, the FP data frames corresponding to the Dedicated Transmission Channel (DCH) are the same as those in the Iub interfaces. However, the size and number of the service data units (SDU) of a Medium Access Control (MAC) layer borne by one PP data frame of the common transmission channels, except for the High-Speed Downlink Shared Channel (HS-DSCH), depend on the flow control mechanism adopted and the specific realization. The situation of the HS-DSCH in the Iur/Iub interfaces is similar to that of the above common transmission channels in the Iur interfaces. For detailed description about the Iur/Iub interface FP data frame protocols, TS25.427, TS25.425 and TS25,435 serial protocol documents of the 3GPP can be consulted.

The FP data frame protocol corresponding to the DCH is completely the same in the Iur/Iub interfaces. This is because the radio interface protocol function entities corresponding to the DCH, such as PDCP/RLC/MAC are all located in the Serving Radio Network Controller (SRNC), that is, the DCH FP data frames bear the MAC layer PDUs (Protocol Data Units, i.e., transmission blocks) corresponding to the DCH. Thus, with respect to the DCH, the DRNC only provides a passage which transparently routes the DCH FP data frames from the SRNC to the Node B controlled by the SRNC. In addition, since part of the MAC layer function entities MAC-hs of the HS-DSCH are located in the Node B, the situation of the HS-DSCH is similar to that of the DCH, that is, the FP data frame protocol of the HS-DSCH is the same in the Iur interfaces as that in the Iub interfaces, and the DRNC only provides a transparent transmission.

Compared with the FP data frame protocol corresponding to the DCH, the FP data frame protocols corresponding to common transmission channels, excepting for the HS-DSCH, in the Iurs are different from those in the Iub interfaces. This is because the MAC layer function entities MAC-c/sh corresponding to the common transmission channels are realized in the Controlling Radio Network Controller (CRNC). Therefore, the FP data frames corresponding to the Iur interface common transmission channels bear the MAC layer SDUs (Service Data Units) corresponding to the common transmission channels, while the FP data frames corresponding to the Iub interface common transmission channels bear the MAC layer PDUs (namely, transmission blocks) corresponding to the common transmission channels.

In order to further expound the method as proposed by the present invention, the DiffServ-based QoS technology used in the IP network is briefly introduced as follows. The IP QoS presented by the IETF (Internet Engineering Task Force) mainly comprises integrated services (IntServ) and differentiated services (DiffServ), wherein the DiffServ is considered to be the most promising technique to solve the QoS problem of the IP network because of its excellent expansion performance,.

The basic idea of the DiffServ is to classify the data streams of users according to QoS requests. The data streams of any user have a free access to the network, but when the network is congested, the data streams with a high degree will have a higher priority than that with a lower degree in aspect of queue and source occupancy. The DiffServ only promises a relative QoS but does not promise a specific QoS index to any user.

Under the DiffServ mechanism, it is necessary to negotiate a service level agreement (SLA) between a user and a network management department. According to the SLA, the data streams of the users are assigned special priority levels, and when the data streams pass through the network, the router will process the packets within the streams by using the corresponding mode which is called a Per-Hop Behavior PHB.

The DiffServ only includes a limited number of service levels and have little condition information, thus easy to be achieved and expanded.

In the DiffServ technology, an edge node of the network classifies packets and marks a DiffServ Code Point (DSCP), and the "Per-Hop Behavior" (PHB) in the classified forwarding of the packets performed by an intermediate node is determined by a DSCP. In the IP network, the field used by a DSCP in IPv4 is a "TOS" (Type of Service) field in the IP header, while the field used by a DSCP in IPv6 is a "Traffic Class" field in the IP header.

In the DiffServ, as shown in FIG. 6, the PHB is divided into three classes: Best Effort (BE) PHB, Expedited Forwarding (EF) PHB and Assured Forwarding (AF) PHB. The packets of BE PHB class are unnecessary to be particularly treated, thus the relating service is the service for making best efforts to deliver; the packets marked with EF should be forwarded with the minimum delay and the packet loss ratio should be lower; AF PHB is further divided into several sub-classes represented by AFxy, wherein x represents the AF classes, thus to allocate different queues for packets according to the AF classes, and y represents a discarding precedence of packet. The AF packets with the same class, namely having the same x, enter the same queue, and when it is necessary to discard a packet during network congestion, the packet having a lower discarding precedence, namely having a greater y value, in the same queue will be firstly discarded.

In the standard TS23.107 of the 3GPP, the QoS architecture of the UMTS is defined, as shown in FIG. 7. In FIG. 7, UMTS bearer services consist of radio access bearer (RAB) service and core network bearer service, and the RAB service further consists of radio bearer service and Iu bearer service. According to TS23.107, the UMTS services are divided into four QoS classes, namely, conversational class, streaming class, interactive class and background class, and with regard to each traffic class, a plurality of parameters reflecting the QoS attributes are further defined, as shown in FIG. 8. According to TS23.107, Iu bearer services and core network bearer services can use the DiffServ to realize the QoS, while the radio bearer services meet the demand for the QoS in the radio interface protocols.

In the UMTS wireless access network UTRAN, the DSCPs of the IP packets in the downlink direction of the Iu interface are marked by the core network 1 according to the QoS attribute parameters of the services requested, and the specific mapping relation between the QoS attribute parameters and the DSCPs is configured by an operator according to the network configuration and operation strategies or the like. Since the UTRAN and the core network are two different DiffServ domains, and the radio network layer data streams on the Iur/Iub interfaces are completely different from the radio network layer data streams on the Iu interfaces, it is necessary to reclassify the IP packets on the Iur/Iub interfaces and remark the DSCP values in the RNC.

In the RNC, two types of QoS-related information can be obtained, namely, the QoS attribute parameters of the RAB provided by the core network during the RAB establishment or modification, and the DSCP values from the Iu interfaces marked by the core network. In the present invention, the QoS-related information and the information associated with radio resources will be used to perform an effective classification to the IP packets in the IP RAN, and are respectively mapped to different DSCP values, so as to guarantee the QoS in the IP RAN transmission.

As above-described, the relevant protocols of the 3GPP present that the transport network layers of Iu, Iur and Iub interfaces need to support the marking of DSCPs so as to support the guaranteed QoS technology based on the Diffserv in the IP RAN, however, how to realize the DiffServ in the IP RAN is still a problem to be solved. The present invention aims at this problem and provides a method for implementing the IP packet classification and the marking of a DiffServ Code Point (DSCP) while achieving the guaranteed quality of service (QoS) by applying the DiffServ (DiffServ) in the IP-based UMTS wireless access network.

SUMMARY OF THE INVENTION

In order to realize the DiffServ in the IP RAN, the present invention provides a method for using Differentiated Services (DiffServ) to implement the IP packet classification and the marking of a DiffServ Code Point (DSCP) for the guaranteed quality of service (QoS) in the wireless access network of the IP-based universal mobile telecommunication system, wherein said mobile communication system comprises a core network, one or more universal terrestrial radio access networks (UTRANs) and a plurality of user equipments (UEs), wherein the core network communicates with the UTRAN via an Iu interface, and said UTRAN communicates with one or more UEs via Uu interfaces, each of said UTRAN comprises a plurality of radio network controllers (RNCs) and one or more Nodes B communicating with said RNC via Iub interfaces, and each Node B comprises one or more cells, and the communication between the RNCs being performed via Iur interfaces; said method comprising the following steps of:

in the outgoing direction of the Iub interfaces at the Node B side, classifying all the uplink Iub interface data streams generated by the Node B into DCH FP data frames, RACH/CPCH FP data frames, and Node B Application Part (NBAP) signaling and Operation & Maintenance (O&M) data streams, and assigning and adjusting the priorities of the classified data streams according to the principles for optimizing the QoS and radio resources;

in the outgoing direction of the Iub interfaces at the RNC side, classifying the transmitted data into: uplink DCH FP data frames transparently forwarded from the Iub interfaces; uplink RACH/CPCH FP data frames from the Iub interfaces, medium access control (MAC) layer service data units (SDU) processed by the MAC layer functional entity (MAC-c/sh) forming the corresponding upward Iur interface RACH/CPCH FP data frames; downlink Iur interface PP data frames generated by the RNC as a SRNC and transmitted to a Drift Radio Network Controller (DRNC); and radio network subsystem application part (RNSAP) signaling streams, and assigning and adjusting the priorities of the classified data streams according to the principles for optimizing the QoS and radio resources; and in the outgoing direction of the Iur interface at the RNC side, classifying the transmitted data into: downlink DCH/HS-DSCH FP data frames transparently forwarded from the Iur interfaces; downlink DSCH FP data frames from the Iur interfaces, the MAC layer SDUs processed by the MAC-c/sh forming the corresponding downlink Iub interface DSCH FP data frames; downlink Iur interface FACH FP data frames which, after being processed by the MAC-c/sh, are multiplied with logic channels and form downlink Iub interface downlink FACH FP data frames; downlink Iub interface FP data frames generated by the RNC and directly transmitted to the Node B; and NBAP signaling and O&M data streams, and assigning and adjusting the priorities of the classified data streams according to the principles for optimizing the QoS and radio resources.

When the network is congested, the data stream with a high level will have a higher priority than that with a lower level in queue and source occupancy, and the packet with a lower discarding precedence in the same queue is discarded. The DiffServ only contain a limited number of service levels and have little condition information, thus easy to achieve and expand.

BRIEF DESCRIPTION OF THE DRAWINGS

The preferred embodiments of the present invention are described as follows by referring to the drawings and examples taken.

FIG. 7 is a schematic view showing the QoS architecture of the UMTS defined in the Standard TS23.107 of the 3GPP.

FIG. 8 is a schematic view showing the QoS attribute parameters of the UMTS bearer services.

FIG. 10 ($b$) is a flow diagram of marking DSCPs of IP packets sent from the Iub interfaces at the RNC side according to the present invention.

FIG. 10($c$) is a flow diagram of marking DSCPs of IP packets sent from the Iur interfaces at the RNC side according to the present invention.

FIG. 11 is a schematic view showing the mapping relation between the priority and the PHB class of the DiffServ.

DESCRIPTION OF THE PREFERRED EMBODIMENTS

Figure 1:
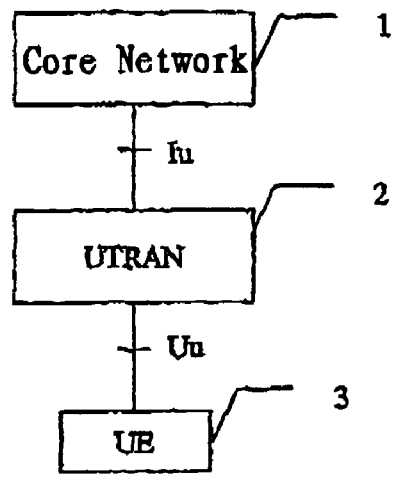
FIG. 1 is a schematic view showing the UMTS (Universal Mobile Telecommunication System) network system architecture.
Figure 2:
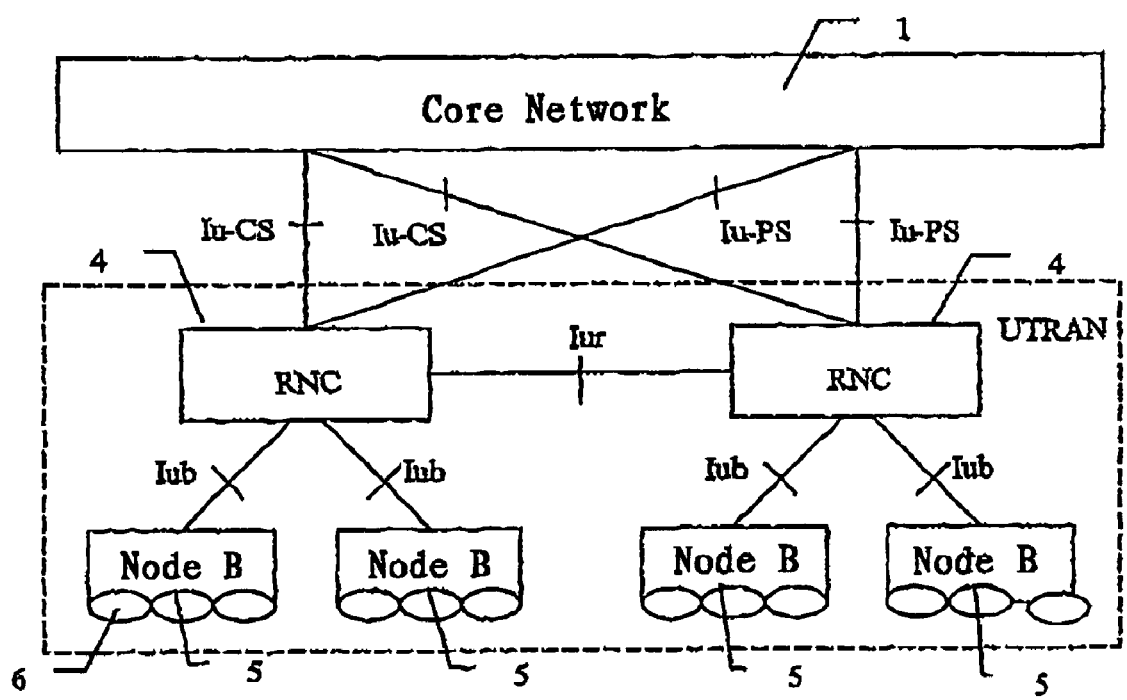
FIG. 2 is a schematic view showing the UTRAN network architecture.
Figure 3:
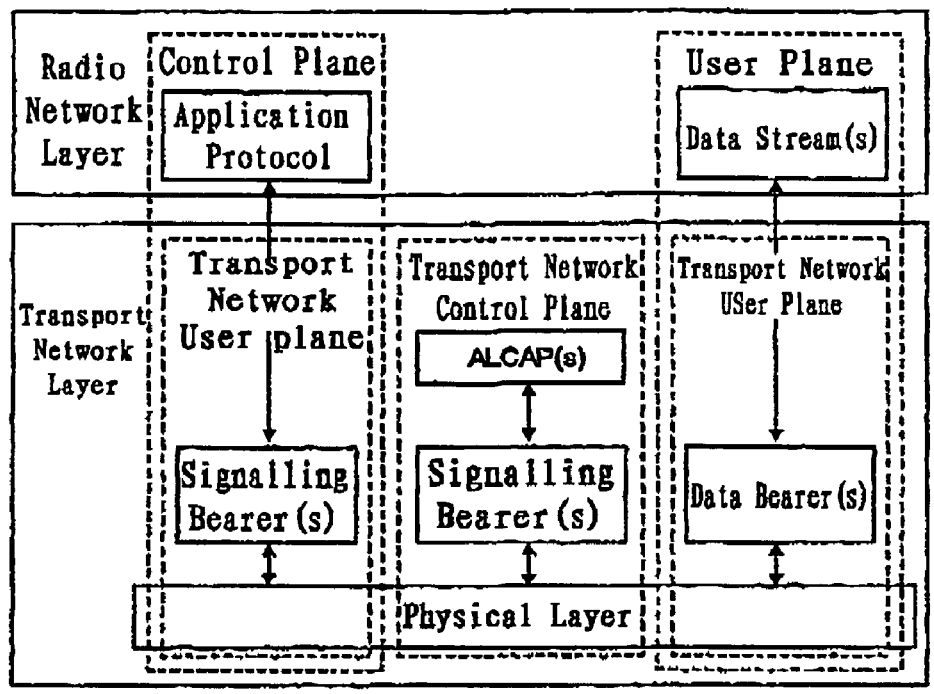
FIG. 3 is a schematic view showing the UTRAN interface protocol architecture.
Figure 4:
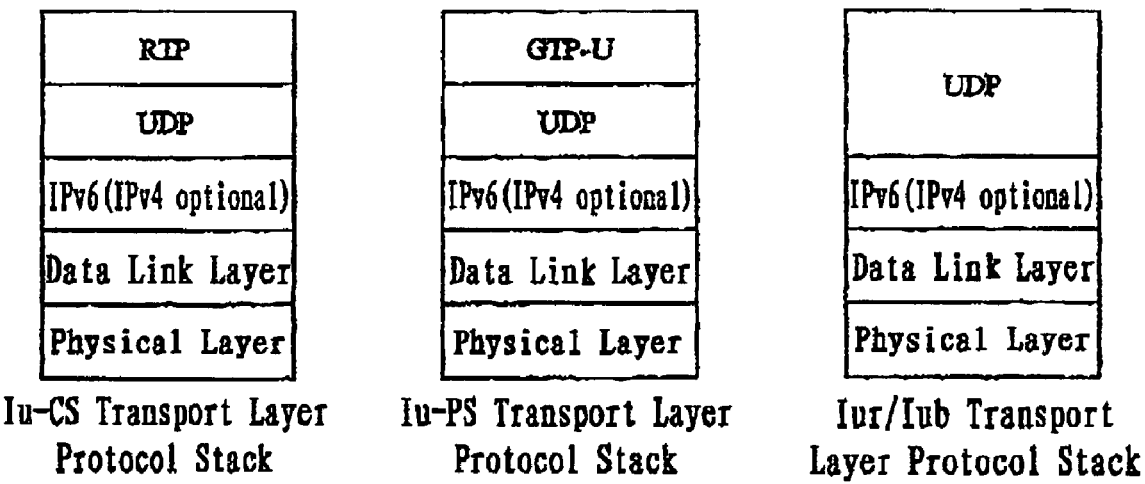
FIG. 4 is a schematic view showing the user plane transprot network layer protocol stacks of Iu, Iur and Iub interfaces based on the IP RAN technology in the UMTS of Release 5.

According to the above-mentioned descriptions and the protocol documents. TS25.427, TS25.425, TS25.435 and the like of the 3GPP, the following conclusions about the multiplexing situation of the user plane FP data frames of the Iur/Iub interfaces are drawn:

1. In the uplink direction, one FP data frame of the iub interfaces corresponding to the Common Transmission Channel RACH/CPCH only contains transmission blocks of the RACH/CPCH channel of a certain user equipment UE, and different FP data frames may correspond to the RACH/CPCH channels of different UEs. After passing through the MAC-c/sh function unit in the CRNC, the FP data frames of one RACH/CPCH on the Iur interfaces still only contain SDUs of the RACH/CPCH channel of a certain UE. However, since the MAC-c/sh functional entity does not exist in Node B, it is impossible to differentiate RACH/CPCH data frames of different users at the Iub interfaces of the Node B.

2. In the downlink direction, the FP data frames of the Iur interface corresponding to the Common Transmission Channel FACH/DSCH only contain MAC-c/sh SDUs of the FACH/DSCH channel of a certain UE. Meanwhile, the FP data frame of each FACH/DSCH further contains a 4-bit CmCH-PI (Common Transmission Channel Priority Indicator) field for the priority handling of packet scheduling function in the MAC-c/sh. After passing through the MAC-c/sh function unit in the CRNC, the FACH may simultaneously transmit logic channels of a plurality of UEs, the BCCH (Broadcast Control Channel) generated in the CRNC, the CCCH (Common Control Channel), the CTCH (Common Traffic Channel) and other logic channels within one TTI, while the Downlink Shared Channel (DSCH) can only transmit logic channels of one UE within one TTI. Thus, the FP data frames of one DSCH of the Iub interfaces only contain transmission blocks of the DSCH channel of a certain UE.

3. In the downlink direction, the PCH FP data frames of the Iub interfaces contain transmission blocks of the Paging Channel (PCH) within one TTI. The PCH bears PCCH (Paging Control Channel) logic channels generated by the CRNC, and the PCCH bears TYPE I paging message generated by the RRC (Radio Rouse Control) layer in the CRNC.

4. In the downlink direction, the FP data frames of a Iur/Iub interface of the HS-DSCH only contain PDUs generated by the MAC-d in the SRNC of a certain UE.

5. Even if the FP data frames of the Iur/Iub interfaces only bear the user plane data units of one UE, for the existence of multi-service multiplexing condition required by different QoSs, a plurality of transmission channels may be multiplexed on one physical channel. Thus, one FP data frame may have transmission blocks of transmission channels required by different QoSs.

According to the above analysis and based on the principles for optimizing QoS and radio resources, the present invention proposes a method (hereinafter shortly referred to as "priority determining rules") for determining the priority of data streams in the Iur/Iub interfaces aiming at the problem of applying the DiffServ in the IP RAN.

(1) According to the above analysis, in addition to the FP data frames of the FACH and PCH of the Iub interfaces, the FP data frames of other Iur/Iub interfaces only contain user data blocks of one UE. Therefore, the priority of the IP packets bearing FP data frames can be determined according to the known QoS-related information of the RNC, namely, the QoS attribute parameters of a radio access bearer (RAB) supplied by the core network during the RAB establishment or modification process and the DSCP values from the Iu interfaces marked by the core network. Regarding the case where one FP data frame may have transmission blocks of the transmission channels required by different QoSs, the priority can be determined according to the highest data rate in the multiplexed services or the service required by the highest QoS. Since the RRC signaling and user data share the same radio bearer (the RRC message and the core network higher signaling which is directly and transparently transmitted by the RRC are borne by the DCCH), the FP data frames which contain RRC signaling data can be assigned a higher priority.

(2) Regarding the FACH data frames of the Iub interfaces, the priority can be determined according to the service required by the highest QoS in the multiplexed logic channel, but a predefined priority can be used for easy realization. Since the paging message is non-connected RRC information, the PCH FP data frames can be assigned a lower priority.

(3) The MAC-c/sh functional entity does not exist in a Node B, and as a result, it is impossible to differentiate RACH/CPCH data frames of different users at the Iub interface of the Node B. Thus, regarding the RACH/CPCH data frames of the Iub interfaces, the same predefined priority can be simply used. Regarding the RACH/CPCH data frames of the Iur interfaces, two methods can be used for determining the priority, namely, using the same predefined priority as that of the RACH/CPCH data frames of the Iub interfaces without discriminating the users, or assigning different priorities to the RACH/CPCH data frames of the Iur interfaces of different users according to the different QoS requests.

(4) All the IP packets which bear control plane radio application protocols of the radio network layer including radio network sub-system application part (RNSAP) and Nobe B application part (NBAP) are assigned the highest priority. The O&M data streams in the UTRAN can be assigned a lower priority.

(5) In the same situation, the uplink data streams have a lower priority than the downlink data streams. The reason is that, the uplink data streams are the data directly from an air interface and have consumed radio resources as resource bottleneck. When the IP transmission network is congested and some IP packets need to be discarded, the discarding of the IP packets of the uplink data in the same situation will result in the consumption of radio resources, while the downlink data is the data from the core network and has not occupied radio resources before reaching the Node B, so it is considered to be firstly discarded.

(6) When a UE is in a soft handoff state, in the uplink direction, if the FP data frames corresponding to the DCH will come from the DRNC, then the DCP FP data frames through the DRNC will have a higher priority than the DCH FP data frames which arrive directly via the Iub interface. The reason is that, in the uplink direction, the SRNC will complete the micro-diversity operation (the DRNC may complete part of the micro-diversity operation), i.e., optionally incorporating soft handoff branches. In order to complete the micro-diversity operation, it is necessary for all the uplink soft handoff branches to arrive within certain time, so as to prevent from generating a greater delay to the radio bearer service and needing a larger buffer memory. Therefore, the uplink DCH FP data frames through the DRNC are assigned a higher priority, which is good to the improvement of the soft handoff performance and the QoS. Similarly, in order to prevent the loss of the downlink soft handoff branches, in the downlink direction, if the FP data frames corresponding to the DCH need to reach the controlled Node B through the DRNC, the DCH FP data frames through the DRNC have a higher priority than the DCH FP data frames which are directly sent to the Node B via the Iub interface (7) When a radio link control (RLC) uses an AM (Assured Mode), in order to reduce transmission delay at the radio interface to improve the performance of the high layer protocol, such as a TCP (Transmission Control Protocol), having the end-to-end flow control function, the IP packets which bear and contain the radio link control (RLC) re-transmission PDUs should be assigned a higher priority. In addition, the RLC using the AM mode further has STATUS, RESET, RESET ACK and other control protocol data units (PDUs), and the IP packets which bear and contain this kind of RLC control PDUs should be assigned a higher priority. Since the UTRAN only has downlink RLC entities, this principle can only be used in the downlink direction.

The DSCP is marked by the IP network edge node, and therefore, in order to classify Egress IP packets and mark the DSCP values for these packets in the RNC and the Node B, the user plane IP packet data streams outgoing from the Node B at the Iub interface and from the RNC at the Iur and Iub interfaces will be further analyzed as follows.

The data streams outgoing from the Iub interface at the Node B are the uplink Iub interface FP data frames, NBAP signaling and operation and maintenance (O&M) data streams.

The data outgoing from the Iur interfaces from the RNC include:
- uplink DCH FP data frames transparently forwarded from the Iub interfaces;
- uplink RACH/CPCH FP data frames from the Iub interface, the MAC layer SDUs processed by the MAC-c/sh forming the corresponding uplink Iur interface RACH/ECPCH FP data frames;
- downlink Iur interface FP data frames generated by the RNC as a SRNC and transmitted to a DRNC; and
- RNSAP signaling streams.

The data outgoing from the Iub interfaces of the RNC include:
- downlink DCH/HS-DSCH FP data frames transparently forwarded from the Iur interfaces;
- downlink DSCH FP data frames from the Iur interfaces, the MAC layer SDUs processed by the MAC-c/sh forming the corresponding downlink Iub interface DSCH FP data frames;
- downlink FACH FP data frames from the Iur interface, which, after being processed by the MAC-c/sh, are multiplexed with other logic channels and form the downlink Iub interface FACH FP data frames;
- downlink Iub interface FP data frames generated by the RNC and directly transmitted to the Node B; and
- NBAP signaling and O&M data streams.

Figure 9:
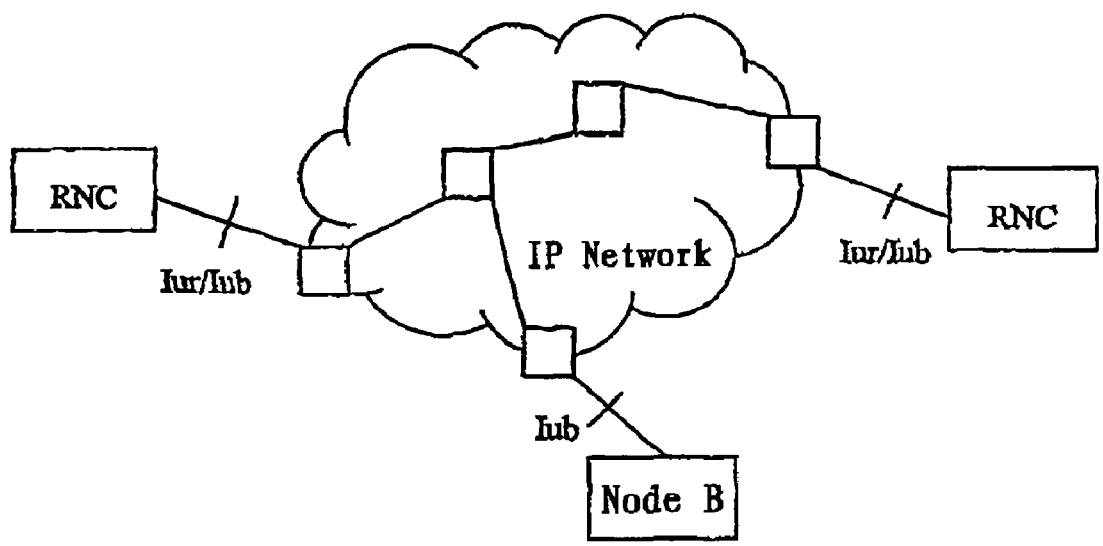
FIG. 9 is a schematic view showing the IP RAN transmission network.

FIG. 9 shows the IP RAN transmission network. Since the transmission networks of the Iur/Iub interfaces are the same IP network, when the DSCP is marked at the Iur/Iub Egress port by the RNC and at the Iub Egress port by the Node B, the same strategy should be used to classify the IP packets and mark the DSCPs.

Figure 10A:
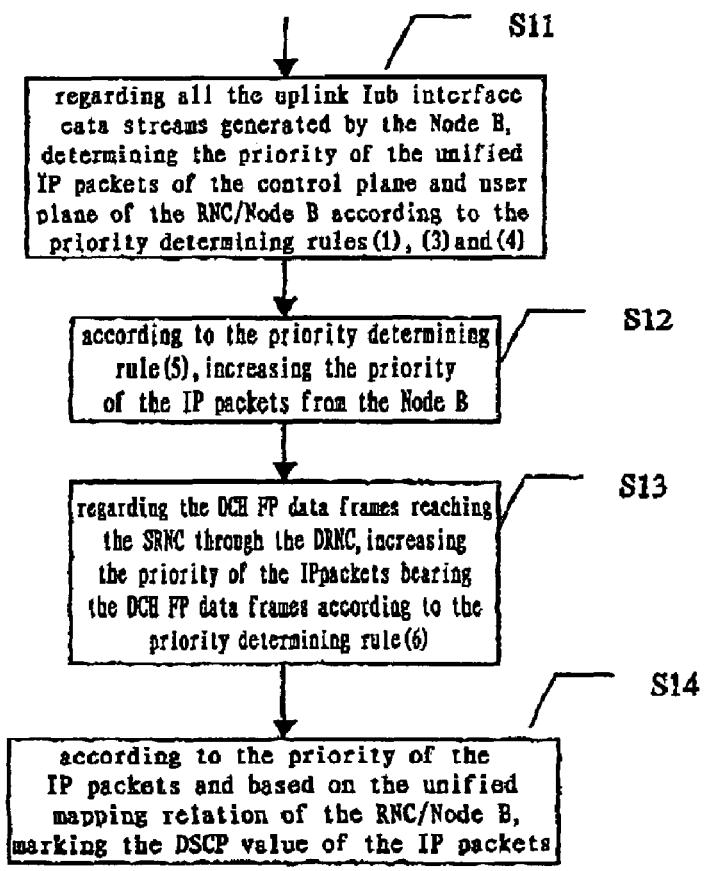
FIG. 10($a$) is a flow diagram of marking DSCPs of IP packets sent from the Iub interfaces at the Node B side according to the present invention.
Figure 10B:
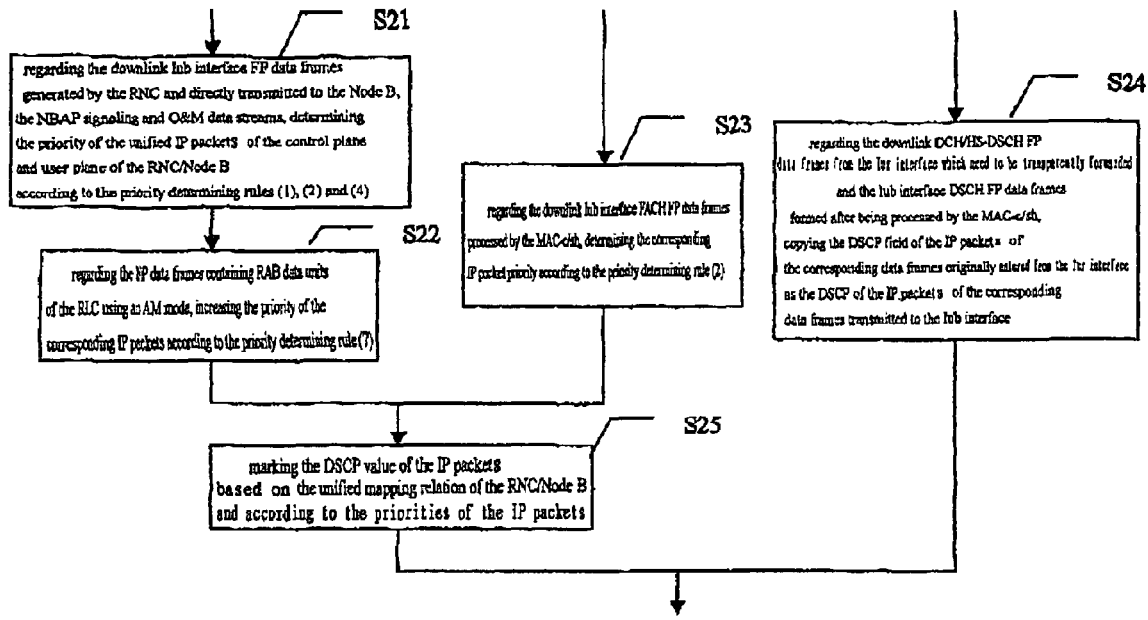
Figure 10C:
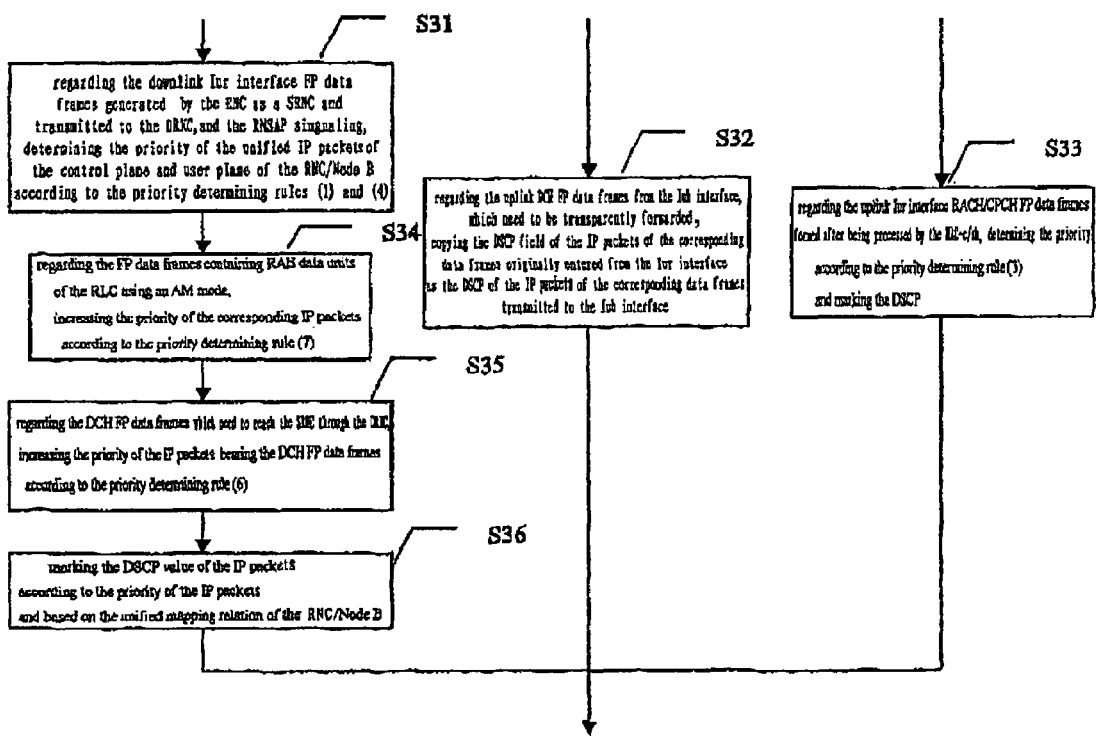

According to the above analysis and the method for determining the priority of the Iur/Iub interface data streams as set forth in the present invention, the method for classifying the IP packets outgoing from the Iub interfaces at the Node B side, the IP packets outgoing from the Iub interfaces at the RNC side and the IP packets outgoing from the Iur interfaces at the RNC side and for marking the DSCP values is shown in FIG. 10 (a), FIG. 10 (b) and FIG. 10 (c), respectively.

As shown in FIG. 10 (a), in step S11, in the Iub interface outgoing direction at the Node B side, regarding all the uplink Iub interface data streams generated by the Node B, including DCH FP data frames and RACH/CPCH FP data frames, NBAP signaling and O&M data streams, the priority of the unified IP packets of the control plane and user plane of the RNC/Node B is determined according to the above priority determining rules (1), (3) and (4). Since what are outgoing from the Iub interfaces at the, Node B side are all the uplink data streams, step S12 is performed subsequently, and according to the priority determining rule (5), the priority of the IP packets from the Node B is increased. Next, step S13 is performed, regarding the DCH PP data frames which arrive at the SRNC through the DRNC, the priority of the IP packets bearing the DCH FP data frames should be increased according to the priority determining rule (6). In step S14, according to the priority of the IP packets and based on the unified mapping relation of the RNC/Node B, the DSCP values of the IP packets are marked.

As shown in FIG. 10 (b), in the outgoing direction of the Iub interfaces at the RNC side, the data fiames or data streams to be differently processed have three coordinate cases. Case 1: in step S21, regarding the downlink Iub interface FP data frames generated by the RNC and directly transmitted to the Node B, the NBAP signaling and O&M data streams, the priority of the unified IP packets of the control plane and user plane of the RNC/Node B is determined according to the priority determining rules (1), (2) and (4); next is step S22, in which if the FP data frames contain RAB data units of the RLC using the AM mode, regarding the IP packets bearing the RLC re-transmitted PDUs and the IP packets bearing STATUS, RESET, RESET ACK and other RLC control PDUs, the priority of the corresponding IP packets should be increased according to the priority determining rule (7). Case 2: in step S23, regarding the downlink Iub interface FACH FP data frames processed by the MAC-c/sh, the priority of the unified corresponding packets of the RNC/Node B is determined according to the priority determining rule (2). Once the priority of the IP packets of the above two types of data streams is determined, step S25 is performed and the DSCP values of the IP packets are marked according to the unified mapping relation of the RNC/Node D. Case 3: in step S24, regarding the downlink DCH/HS-DSCH FP data frames from the Iur interfaces that need to be transparently forwarded and the Iub interface DSCH FP data frames formed after being processed by the MAC-c/sh, the DSCP field of the IP packets of the corresponding data frames originally entering from the Iur interface are regarded as the DSCP of the IP packets of the corresponding data frames transmitted to the Iub interfaces.

As shown in FIG. 10 (c), in the outgoing direction of the Iur interfaces at the RNC side, the data frames or data streams to be differently processed have three coordinate cases. Case 1: in step S31, regarding the downlink Iur interface FP data frames generated by the RNC as a SRNC and transmitted to the DRNC, and the RNSAP signaling, the priority of the unified IP packets of the control plane and user plane of the RNC/Node B is determined according to the above priority determining rules (1) and (4); next is step S34, in which if the FP data frames contain RAB data units of the RLC using the AM mode, regarding the IP packets bearing the RLC re-transmitted PDUs and the IP packets bearing STATUS, RESET, RESET ACK and other RLC control PDUs, the priority of the corresponding IP packets should be increased according to the priority determining rule (7); step S35 is subsequently performed, in which if the FP data frames are the DCH FP data frames which need to arrive at the SRNC through the DRNC, the priority of the IP packet bearing the DCH FP data frames should also be increased according to the priority determining rule (6). Then step S36 is performed, and once the priority of the IP packets for the above type of data streams is determined, the DSCP values of the IP packets can be marked according to the unified mapping relation of the RNC/Node B. Case 2: in step S32, regarding the uplink DCH FP data frames from the Iub interfaces which need to be transparently forwarded, the DSCP fields of the IP packets of the corresponding data frames originally entered from the Iur interfaces are copied as the DSCPs of the IP packets of the corresponding data frames transmitted to the Iub interfaces. Case 3: in step S33, regarding the uplink Iur interface RACH/CPCH FP data frames processed by the MAC-c/sh, the priority is determined and the DSCP is marked according to the priority determining rule (3).

Need to note that, with regard to the aforesaid rules for determining priority of the data streams across the Iur/Iub interface as presented in the present invention, some or all of them can be optionally used in the specific implementation according to need, for example, in order to reduce the complexity for realization. Thus, if some of the "rules for determining priority" are not adopted, then the corresponding steps containing these rules can be omitted in the method for determining priority of the data streams across the Iur/Iub interface as shown in FIG. 10 (a), FIG. 10 (b) and FIG. 10 (c).

In addition, the present invention is not limited to the mapping relation between the priority of the data streams across the Iur/Iub interface and the DSCP, and it can be configured by network operators according to the specific network configuration and operation strategies in the specific implementation.

The following descriptions will give further explanations about the method for implementing the IP packet classification and the marking of a Differential Service Code Point (DSCP) while achieving the guaranteed QoS by applying DiffServ in the IP RAN as proposed in the present invention.

FIG. 11 shows a typical example of the assignment of priority of UTRAN data streams and PHB classes of the DiffServ. In this example, the priority is divided into 10 levels, wherein according to the priority determining rule (4), the data streams of RNSAP/NBAP and other control plane radio application protocols have a highest priority taking the value of 1, and the O&M data streams have a lowest priority taking the value of 10.

As above-described, two types of QoS-related information can be obtained in the RNC, namely, the QoS attribute parameters of the radio access bearer (RAB). supplied by the core network during the RAB establishment or modification process, and the DSCP values from the Iu interfaces marked by the core network. In this example, the UMTS bearer service data streams are simply assigned different priorities according to the traffic class in the QoS attribute parameters of the RAB supplied by the core network during the RAB establishment or modification process, namely that, the priority of the conversational class service is 2, the priority of the streaming class service is 3~5, the priority of the interactive class service is 6~8, and the priority of the background class service is 9. Regarding the streaming class service and interactive class service, the initial priority is 3 and 6, respectively.

Figures 5, 6:
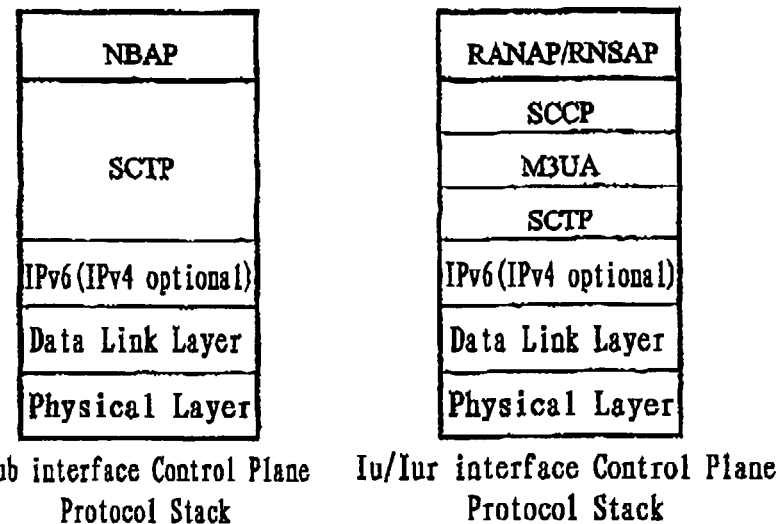
FIG. 5 is a schematic view showing the control plane protocol stacks of Iu, Iur and Iub interfaces based on the IP RAN technology in the UMTS of Release 5.
FIG. 6 is a schematic view showing suggested values of DSCPs for the standard PHB in the DiffServ

FIG. 11 further shows the mapping relation between the priority and the PHB class of the DiffServ, wherein the high priorities 10 and 9 correspond to the EF class of the DiffServ, the priorities 8, 7 and 6 respectively correspond to $AF_{11}$, $AF_{12}$ and $AF_{13}$ of the DiffServ, and the priorities 5, 4 and 3 respectively correspond to $AF_{21}$, $AF_{22}$ and $AF_{23}$, and the low priorities 2 and 1 correspond to the BE class of the DiffServ. In this example, the mapping relation between the PHB class of the DiffServ and the DSCP uses typical values as shown in FIG. 6.

In the outgoing direction of the Iub interfaces at the Node B side, firstly regarding all the uplink Iub interface data streams generated by the Node B, including DCH FP data frames, RACH/CPCH FP data frames, and NBAP and O&M data streams, the priority of the IP packets is determined according to the priority determining rules (1), (3) and (4). More specifically, the DCH can bear various traffic classes while the RACH and CPCH can typically bear the interactive class and the background class services, therefore, the priority of the corresponding DCH FP data frames and RACH/CPCH FP data frames can be assigned according to the traffic classes borne, as shown in FIG. 11. Regarding the NBAP signaling and O&M data streams, the priority takes 10 and 1, respectively.

What are outgoing from the Iub interfaces at the Node B side are the uplink data streams, so the priority of all the IP packets from the Node B is increased by 1 according to the priority determining rule (5); regarding the DCH FP data frames which need to reach the SRNC through the DRNC, the priority of the IP packets bearing the DCH FP data frames is increased by 1 according to the priority determining rule (6). If the priority of one data stream is greater than 10 after being increased, then it will still take 10. After the priority is determined, the DSCPs of the data streams outgoing from the Iub interface at the Node B side can be marked according to the mapping relation between the priority and the PHB class of the DiffServ as shown in FIG. 11 and the mapping relation between the PHB class of the DiffServ and the DSCP as shown in FIG. 6.

Meanwhile, in the outgoing direction of the Iub interface at the RNC side, regarding the downlink Iub interface FP data frames generated by the RNC and directly transmitted to the Node B, the NBAP signaling and O&M data streams, the priority of the IP packets is determined according to the priority determining rule (1), (2) and (4). More specifically, the priority of the IP packets corresponding to respective FP data frames can be assigned according to the traffic classes borne by the corresponding transmission channels, as shown in FIG. 11. Regarding the NBAP signaling and O&M data streams, the priority takes 10 and 1, respectively.

If the FP data frames contain the RAB data units of the RLC using the AM mode, according to the priority determining rule (7), regarding the IP packets bearing the RLC re-transmitted PDUs and the IP packets bearing STATUS, RESET, RESET ACK and other RLC control PDUs, the priority of the IP packets corresponding to the FP data frames is increased by 1. Regarding the downlink Iub interface FACH FP data frames processed by the MAC-c/sh, the priority of its corresponding IP packets is determined according to the priority determining rule (2). In this example, the priority of the IP packets corresponding to the downlink Iub interface FACH FP data frames fixedly takes the value of 3, while the priority of the IP packets corresponding to the PCH FP data frames fixedly takes the value of 2.

Once the priorities of the IP packets of the above two types of data streams are determined, the DSCPs of the data streams outgoing from the Iub interfaces at the RNC side can be marked according to the mapping relation between the priority and the PHB class of the DiffServ as shown in FIG. 11 and the mapping relation between the PHB class of the DiffServ and the DSCP as shown in FIG. 6. In addition, regarding the downlink DCH/HS-DSCH FP data frames from the Iur interfaces which need to be transparently forwarded, and the Iub interface DSCH FP data frames formed after being processed by the MAC-c/sh, the DSCP field of the IP packets of the corresponding data frames originally entered from the Iur interface is regarded as the DSCP of the IP packets of the corresponding data frames transmitted to the Iub interfaces.

In the outgoing direction of the Iur interface at the RNC side, regarding the downlink Iur interface FP data frames generated by the RNC as a SRNC and transmitted to the DRNC, and the RNSAP signaling, the priority of the IP packets is determined according to the priority determining rules (1) and (4). More specifically, the priorities of the IP packets corresponding to respective FP data frames can be assigned according to the traffic class borne by the corresponding transmission channel as shown in FIG. 11, while the priority of the RNSAP signaling takes 10.

If the FP data frames contain the RAB data units of the RLC using the AM mode, according to the priority determining rule (7), regarding the IP packets bearing the RLC re-transmitted PDUs and the IP packet bearing STATUS, RESET, RESET ACK and other RLC control PDUs, the priority of the IP packets corresponding to the FP data frames is increased by 1. If the FP data frames are the DCH FP data frames that need to reach the SRNC through the DRNC, the priority of the IP packets corresponding to the FP data frames is increased by 1 according to the priority determining rule (6). Regarding the corresponding uplink Iur interface RACH/CPCH FP data frames formed after being processed by the MAC-c/sh, in this example, for simplification, a predefined priority which is the same as that of the Iub interface RACH/CPCH data frames is used without differentiating the users, namely, the priority takes 3.

Once the priority of the IP packets of the above data streams is determined, the DSCPs of the data streams outgoing from the Iur interface at the RNC side can be marked according to the mapping relation between the priority and the PHB class of the DiffServ as shown in FIG. 11 and the mapping relation between the PHB class of the DiffServ and the DSCP as shown in FIG. 6. In addition, regarding the uplink DCH FP data frames from the Iub interfaces which need to be transparently forwarded, the DSCP fields of the IP packets of the corresponding data frames originally entered from the Iur interfaces is copied as the DSCPs of the IP packets of the corresponding data frames transmitted to the Iub interfaces.

As an exemplary one, the above-mentioned example adopts an example of the assignment of priority of data streams in the IP RAN and the PHB class of the DiffServ. However, as above-stated, the method set forth in the present invention is not limited to the specific mapping relation between the priority of the data streams across the Iur/Iub interfaces and the DSCPs, and it can be configured by network operators according to the network configuration and operation strategies in the specific implementation.

What is claimed is:

1. A method for marking a DiffeServ Code Point (DSCP) while achieving guaranteed quality of service (QoS) by using Differentiated Services (DiffServ) in the wireless access network of the IP-based universal mobile telecommunication system (UMTS), wherein said mobile communication system comprises a core network, one or more universal terrestrial radio access networks (UTRANs) and a plurality of user equipments (UEs), wherein the core network communicates with the UTRAN via an Iu interface, and said UTRAN communicates with one or more UEs via Uu interfaces, each of said UTRAN comprises a plurality of radio network controllers (RNCs) and one or more Nodes B communicating with said RNC via Iub interfaces, and each Node B comprises one or more cells, and the communication between the RNCs being performed via Iur interfaces; said method comprising the following steps of:

in the outgoing direction of the Iub interfaces at the Node B side, the node B side classifying all the uplink Iub interface data streams generated by the Node B into DCH FP data frames, RACH/CPCH FP data frames, and Node B Application Part (NBAP) signaling and Operation & Maintenance (O&M) data streams, and assigning and adjusting the priorities of the classified data streams according to the principles for optimizing the QoS and radio resources;

in the outgoing direction of the Iub interfaces at the RNC side, the RNC side classifying the transmitted data into: uplink DCH FP data frames transparently forwarded from the Iub interfaces; uplink RACH/CPCH FP data frames from the Iub interfaces, medium access control (MAC) layer service data units (SDU) processed by the MAC layer functional entity (MAC-c/sh) forming the corresponding upward Iur interface RACHICPCH FP data frames; downlink Iur interface FP data frames generated by the RNC as a SRNC and transmitted to a Drift Radio Network Controller (DRNC); and radio network sub-system application part (RNSAP) signaling streams, and assigning and adjusting the priorities of the classified data streams according to the principles for optimizing the QoS and radio resources; and in the outgoing direction of the Iur interface at the RNC side, the RNC side classifying the transmitted data into: downlink DCH/HS-DSCH FP data frames transparently forwarded from the Iur interfaces; downlink DSCH FP data frames from the Iur interfaces, the MAC layer SDUs processed by the MAC-c/sh forming the corresponding downlink Iub interface DSCH FP data frames; downlink Iur interface FACH FP data frames which, after being processed by the MAC-c/sh, are multiplexed with logic channels and form downlink Iub interface downlink FACH FP data frames; downlink Iub interface FP data frames generated by the RNC and directly transmitted to the Node B; and NBAP signaling and O&M data streams, and assigning and adjusting the priorities of the classified data streams according to the principles for optimizing the QoS and radio resources.

2. The method as defined in claim 1, wherein the step of assigning the priorities of various data streams in the outgoing direction of the Iub interfaces at the Node B side further comprises the following steps of:

regarding DCH FP data frames and RACH/CPCH FP data frames in the uplink Iub interface data streams generated by the Node B, assigning corresponding priorities to the DCH FP data streams and the RACH/CPCH FP data frames according to the borne classes of services;

assigning a highest priority to the NBAP signaling and assigning a lower priority to the O&M data streams;

increasing the priority of the IP packets from the Node B;

regarding the DCH FP data frames which need to reach the SRNC through the DRNC, increasing the priority of the IP packets bearing the DCH FP data frames; and marking DSCP values of the IP packets according to the priority of the IP packets and the unified mapping relation of the RNC/Node B.

3. The method as defined in claim 1, wherein the step of assigning the priorities of various data streams in the outgoing direction of the Iub interfaces at the RNC side further comprises the following steps of:

regarding downlink Iub interface FP data frames generated by the RNC and directly transmitted to the Node B, assigning corresponding IP packet priorities to the FP data streams according to the classes of the services borne by the corresponding transmission channels;

assigning a highest priority to the NBAP signaling and assigning a lower priority to the O&M data streams;

if the FP data frames contain radio access bearer (RAB) data units of a radio link control (RLC) using an AM mode, regarding the IP packets bearing RLC re-transmitted PDUs and the IP packets bearing STATUS, RESET, RESET ACK and other RLC control PDUs, increasing the priority of the IP packets corresponding to the FP data frames;

regarding the downlink Iub interface FACH FP data frames having been processed by the MAC-c/sh, using a pre-defined priority, and assigning a lower priority to the FP data frames of a paging channel (PCH);

marking the DSCP value of the IP packets according to the unified mapping relation of the RNC/Node B; and regarding downlink DCH/HS-DSCH FP data frames from the Iur interfaces which need to be transparently forwarded, and the Iub interface DSCH FP data frames formed after being processed by the MAC-c/sh, a DSCP fields of the IP packets corresponding to the data frames originally entered from the Iur interfaces being directly regarded as the DSCPs of the IP packets of the corresponding data frames transmitted to the Iub interfaces.

4. The method as defined in claim 1, wherein the step of assigning the priorities of various data streams in the outgoing direction of the Iur interface at the RNC side further comprises the following steps of:
  regarding downlink Iur interface FP data frames generated by the RNC as a SRNC and transmitted to the DRNC and the RNSAP signaling, assigning the corresponding IP packet priorities to the FP data streams according to the classes of the service borne by the corresponding transmission channels;
  if the FP data frames contain radio access bearer (RAB) data units of a radio link control (RLC) using an AM mode, regarding the IP packets bearing RLC re-transmitted PDUs and the IP packets bearing STATUS, RESET, RESET ACK and other RLC control PDUs, increasing the priority of the corresponding IP packets;
  if the FP data frames are the DCH FP data frames which need to reach the SRNC through the DRNC, increasing the priority of the IP packets bearing the DCH FP data frames;
  once the priorities of the IP packets of the above types of data streams are determined, marking the DSCP values of the IP packets according to the unified mapping relation of the RNC/Node B; and
  regarding uplink DCH FP data frames from the Iub interfaces which need to be transparently forwarded, DSCP fields of the IP packets of the corresponding data frames originally entered from the Iur interfaces being directly copied as the DSCPs of the IP packets of the corresponding data frames transmitted to the Iub interfaces; and
  regarding the uplink Iur interface RACH/CPCH FP data frames formed after being processed by the MAC-c/sh, using one same predefined priority and marking the DSCP.

5. The method as defined in claim 1, wherein
  the step of assigning the priority of various data streams in the outgoing direction of the Iub interfaces at the Node B side further comprises the step of: regarding the DCH FP data frames and RACH/CPCH FP data frames in the uplink Iub interface data streams generated by the Node B, assigning the corresponding priorities to the DCH FP data frames and RACH/CPCH FP data frames according to the borne classes of services;
  the step of assigning the priority of various data streams in the outgoing direction of the Iub interface at the RNC side further comprises the step of: regarding the downlink Iub interface FP data frames generated by the RNC and directly transmitted to the Node B, assigning the priorities of the IP packets corresponding to respective FP data frames according to the classes of services borne by the corresponding transmission channels; and
  the step of assigning the priority of various data streams in the outgoing direction of the Iur interface at the RNC side further comprises the step of: regarding the downlink Iur interface FP data frames generated by the RNC as a SRNC and transmitted to the DRNC and the RNSAP signaling, determining the priorities of the IP packets corresponding to respective FP data frames according to the classes of services borne by the corresponding transmission channels.

6. The method as defined in claim 1, wherein:
  the step of assigning the priority of various data streams in the outgoing direction of the Iub interfaces at the Node B side further comprises the step of: assigning a highest priority to the NBAP signaling and assigning a lower priority to the O&M data streams;
  the step of assigning the priority of various data streams in the outgoing direction of the Iub interface at the RNC side further comprises the step of: assigning a highest priority to the NBAP signaling and assigning a lower priority to the O&M data streams; and
  the step of assigning the priority of various data streams in the outgoing direction of the Iur interface at the RNC side further comprises the step of: assigning a highest priority to the NBAP signaling and assigning a lower priority to the O&M data streams.

7. The method as defined in claim 1, wherein:
  the step of assigning the priority of various data streams in the outgoing direction of the Iub interfaces at the Node B side further comprises the step of: increasing the priorities of the IP packets transmitted from the Node B.

8. A method as defined in claim 1, wherein:
  the step of assigning the priorities of various data streams in the outgoing direction of the Iub interfaces at the Node B side further comprises the step of: regarding the DCH FP data frames which need to reach the SRNC through the DRNC, increasing the priority of the IP packets bearing the DCH FP data frames; and
  the step of assigning the priority of various data streams in the outgoing direction of the Iur interfaces at the RNC side further comprises the step of: increasing the priority of the IP packets bearing the DCH FP data frames.

9. The method as defined in claim 1, wherein:
  the step of assigning the priority of varius data streams in the outgoing direction of the Iub interfaces at the RNC side further comprises the step of: if the FP data frames contain RAB data units of the RNC using an AM mode, regarding the IP packets bearing RLC re-transmitted PDUs and the IP packets bearing STATUS, RESET, RESET ACK and other RLC control PDUs, increasing the priority of the IP packets corresponding to the FP data frames; and
  the step of assigning the priority of various data streams in the outgoing direction of the Iur interfaces at the RNC side further comprises the step of: if the FP data frames contain radio access bearer (RAB) data units of a radio link control (RLC) using an AM mode, regarding the IP packets bearing RLC re-transmitted PDUs and the IP packets bearing STATUS, RESET, RESET ACK and other RLC control PDUs, increasing the priority of the corresponding IP packets.

10. The method as defined in claim 1:
  the step of assigning the priority of various data streams in the outgoing direction of the Iub interfaces at the RNC side further comprises the step of: regarding the downlink Iub interface FACH FP data frames having been processed by the MAC-c/sh, using a predefined priority, and since the paging information is non-connected RRC message, the FP data frames of the PCH being assigned a lower priority; and
  the step of assigning the priority of various data streams in the outgoing direction of the Iur interfaces at the RNC side further comprises the step of: regarding the corresponding uplink Iur interface RACH/CPCH FP data frames formed after being processed by the MAC-c/sh, using the same one predefined priority and marking the DSCP.

11. The method according to any one of the above claims, wherein when the network is congested, the data streams having a high level will have the higher priority than those having a lower level in aspect of queue and source occupancy, and the packets having a lower priority in the same queue are discarded.

* * * * *